United States Patent
Kashiwa

(10) Patent No.: US 8,963,475 B2
(45) Date of Patent: Feb. 24, 2015

(54) MICRO-STEP DRIVING CONTROL APPARATUS FOR STEPPING MOTOR

(75) Inventor: Munetaka Kashiwa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 199 days.

(21) Appl. No.: 13/820,792

(22) PCT Filed: Oct. 3, 2011

(86) PCT No.: PCT/JP2011/072779
§ 371 (c)(1),
(2), (4) Date: Mar. 5, 2013

(87) PCT Pub. No.: WO2012/046693
PCT Pub. Date: Apr. 12, 2012

(65) Prior Publication Data
US 2013/0162191 A1 Jun. 27, 2013

(30) Foreign Application Priority Data
Oct. 5, 2010 (JP) ................................. 2010-225679

(51) Int. Cl.
*H02P 8/22* (2006.01)
*H02P 8/38* (2006.01)

(52) U.S. Cl.
CPC ... *H02P 8/38* (2013.01); *H02P 8/22* (2013.01)
USPC .......................................... 318/685; 318/437

(58) Field of Classification Search
USPC .................. 318/685, 696, 400.32, 721, 437
See application file for complete search history.

(56) References Cited

U.S. PATENT DOCUMENTS

| 3,893,012 A * | 7/1975 | Lin ............................. 318/696 |
| 6,204,625 B1 * | 3/2001 | Seno ........................... 318/685 |
| 6,285,155 B1 * | 9/2001 | Maske et al. .............. 318/685 |

(Continued)

FOREIGN PATENT DOCUMENTS

| JP | 1 107699 | 4/1989 |
| JP | 1 107700 | 4/1989 |
| JP | 1 218393 | 8/1989 |

(Continued)

OTHER PUBLICATIONS

International Search Report Issued Dec. 20, 2011 in PCT/JP11/72779 Filed Oct. 3, 2011.

*Primary Examiner* — Bentsu Ro
(74) *Attorney, Agent, or Firm* — Oblon, Spivak, McClelland, Maier & Neustadt, L.L.P.

(57) ABSTRACT

A micro-step driving control apparatus for a stepping motor in which torque fluctuations caused by influence of detent torque can be reduced without performing preliminary driving, including: a phase difference estimator calculating, based on detected motor current and a command value, an estimated phase difference between the command value and the current; low-speed and high-speed motor rotational angle estimators calculating an estimated motor rotational angle at a low speed rotation and an estimated motor rotational angle at a high speed rotation; an addition unit calculating, based on the command value, an estimated motor rotational angle by mixing the estimated motor rotational angles at an appropriate rate; a detent torque estimator calculating, based on the mixed estimated motor rotational angle, estimated detent torque; and a compensation signal generator generating a compensation signal based on the estimated detent torque and the mixed estimated motor rotational angle.

16 Claims, 6 Drawing Sheets

(56) References Cited

U.S. PATENT DOCUMENTS

| | | | |
|---|---|---|---|
| 7,733,051 B2 * | 6/2010 | Tsui et al. .................... | 318/685 |
| 8,125,174 B2 * | 2/2012 | Miyauchi .................... | 318/685 |

FOREIGN PATENT DOCUMENTS

| | | |
|---|---|---|
| JP | 5 137396 | 6/1993 |
| JP | 6 153591 | 5/1994 |
| JP | 6 245592 | 9/1994 |
| JP | 6 343294 | 12/1994 |
| JP | 8 70596 | 3/1996 |
| JP | 9 163798 | 6/1997 |
| JP | 11 27990 | 1/1999 |
| JP | 2000 78892 | 3/2000 |
| JP | 2001 178193 | 6/2001 |
| JP | 2005 210786 | 8/2005 |
| JP | 2006 271117 | 10/2006 |
| JP | 2007 37321 | 2/2007 |
| JP | 2008 161028 | 7/2008 |
| JP | 2010 51070 | 3/2010 |
| JP | 2010 268675 | 11/2010 |

* cited by examiner

MICRO-STEP DRIVING CONTROL APPARATUS FOR STEPPING MOTOR

TECHNICAL FIELD

The present invention relates to micro-step driving control apparatuses for stepping motors.

BACKGROUND ART

Micro-step driving for a stepping motor is a driving control method for reducing torque fluctuations during rotation of the motor by stepwise changing current values to be applied to respective phases of the stepping motor so that the current wave form approximates a sine wave. By reducing torque fluctuations, a stepping motor can be driven to rotate evenly with low vibration. However, when a stepping motor includes a permanent magnet thereinside, torque fluctuations while the motor is driven to rotate sometimes cannot be reduced even if the micro-step driving is employed, owing to the influence of holding torque ("detent torque" hereinafter) generated when the stepping motor is not excited.

In a conventional micro-step driving apparatus for a stepping motor, a method described below is employed in order to eliminate the influence of the detent torque. That is, before using a stepping motor, the stepping motor is preliminarily driven and, during the preliminary driving, differences between target rotational angles and actual response rotational angles are measured by a position sensor such as an encoder. Corrective current values necessary for eliminating the differences during the passage of time are calculated and the calculated corrective current values are stored in a storage medium in advance. When the stepping motor is actually used, the corrective current values stored in the storage medium are read out as the time passes from the driving start point of the stepping motor, and the stepping motor is driven to rotate by adding the read out corrective current values to fundamental current values for the micro-step driving (for example, see Patent Document 1).

PRIOR ART DOCUMENT

Patent Document

Patent Document 1: Japanese Unexamined Patent Application Publication No. H01-107700

SUMMARY OF THE INVENTION

Problem that the Invention is to Solve

In the conventional micro-step driving apparatus for a stepping motor, since it is necessary to measure corrective current values by performing preliminary driving in advance for each of stepping motors to be used, there has been a problem that it takes time to develop a driving system for the stepping motors.

Moreover, the corrective current values are read out as the time passes from the driving start point of the stepping motor. Therefore, if the slightest difference, caused by a long-term change etc. of friction torque of a driving shaft of the stepping motor, occurs between a time-dependent change of a motor rotational angle when the preliminary driving is performed and a time-dependent change of a motor rotational angle when the stepping motor is actually used, a time difference is generated between the corrective current values read out from the storage medium and corrective current values actually necessary to correct detent torque, resulting in a phase error. When the stepping motor is driven to rotate using the corrective current values containing the phase error, there has been a problem that not only it is unable to reduce torque fluctuations but also the torque fluctuations are further increased at worst.

The present invention has been made to solve the above described problems, and an objective thereof is to provide a micro-step driving control apparatus for a stepping motor in which no prior work such as measurement of corrective current values by performing preliminary driving is necessary for reducing torque fluctuations caused by the influence of detent torque and also the torque fluctuations can be reduced even if motor driving conditions are changed due to long-term change etc. of friction torque.

Means for Solving the Problem

A micro-step driving control apparatus for a stepping motor according to the present invention is comprised of a driver for driving the stepping motor; a control circuit for supplying a micro-step driving signal to the driver; a command value generator for supplying a command value to the control circuit; a current detector for detecting actual current passing through the stepping motor; a phase difference estimator for calculating, based on the command value and detected current detected by the current detector, an estimated phase difference between the command value and the detected current; a low-speed motor rotational angle estimator for calculating, based on the detected current and the micro-step driving signal, an estimated motor rotational angle $\theta_{MEL}$ when the stepping motor rotates at a speed too low to calculate the estimated phase difference with appropriate accuracy; a high-speed motor rotational angle estimator for calculating, based on the estimated phase difference and the command value, an estimated motor rotational angle $\theta_{MEH}$ when the stepping motor rotates at a high speed; an addition unit for calculating, based on a low-speed estimated angle gain and a high-speed estimated angle gain each of whose amplifying value varies according to the command value, an estimated motor rotational angle $\theta_{ME}$ by mixing the estimated motor rotational angle $\theta_{MEL}$ and the estimated motor rotational angle $\theta_{MEH}$ at an appropriate rate; a detent torque estimator for calculating, based on the estimated motor rotational angle $\theta_{ME}$, estimated detent torque; and a compensation signal generator for generating a compensation signal based on the estimated detent torque and the estimated motor rotational angle $\theta_{ME}$.

Advantageous Effects of the Invention

According to the present invention, it is possible to provide a micro-step driving control apparatus for a stepping motor in which no prior work such as measurement of corrective current values by performing preliminary driving is necessary for reducing torque fluctuations caused by the influence of detent torque and also the torque fluctuations can be reduced even if motor driving conditions are changed due to long-term change etc. of friction torque.

BEST MODE FOR CARRYING OUT THE INVENTION

Embodiment 1

Figure 1:
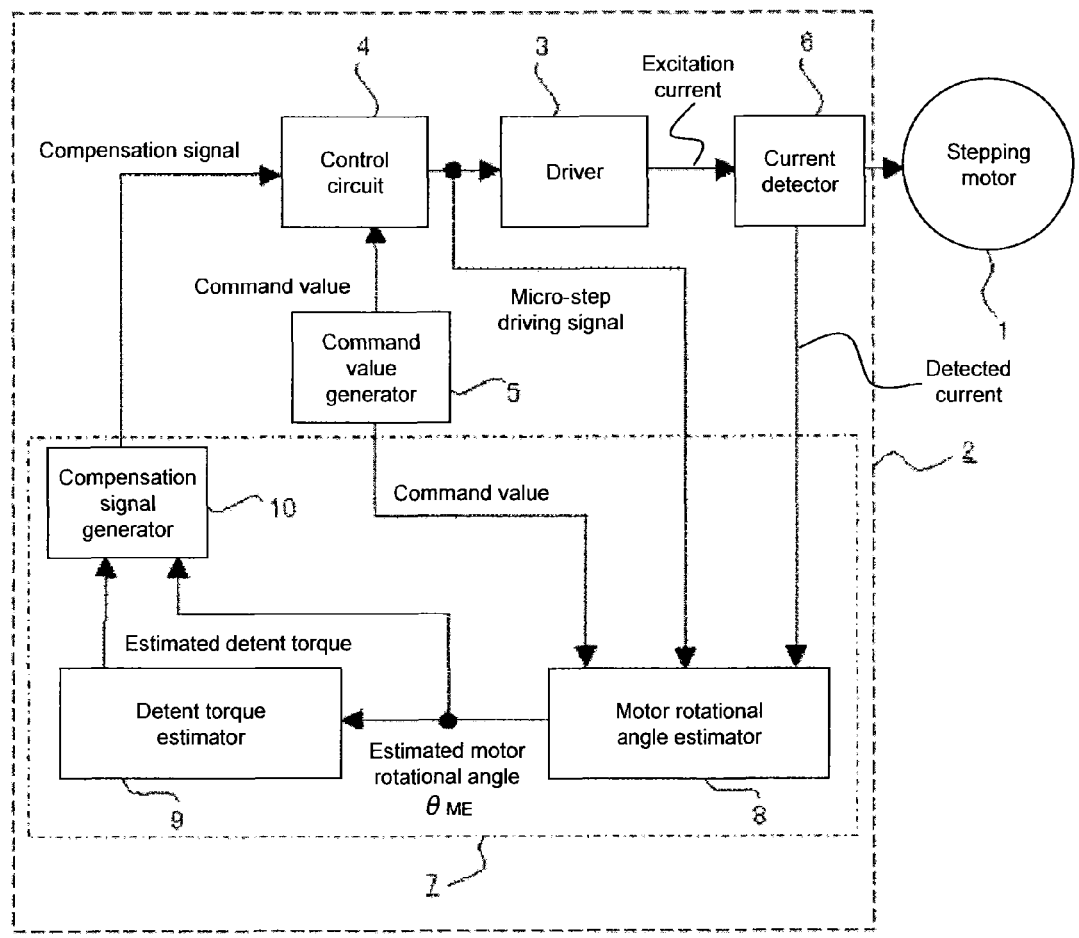
FIG. 1 is a block diagram showing a configuration of a micro-step driving control apparatus for a stepping motor, according to Embodiment 1 of the present invention.
Figure 2:
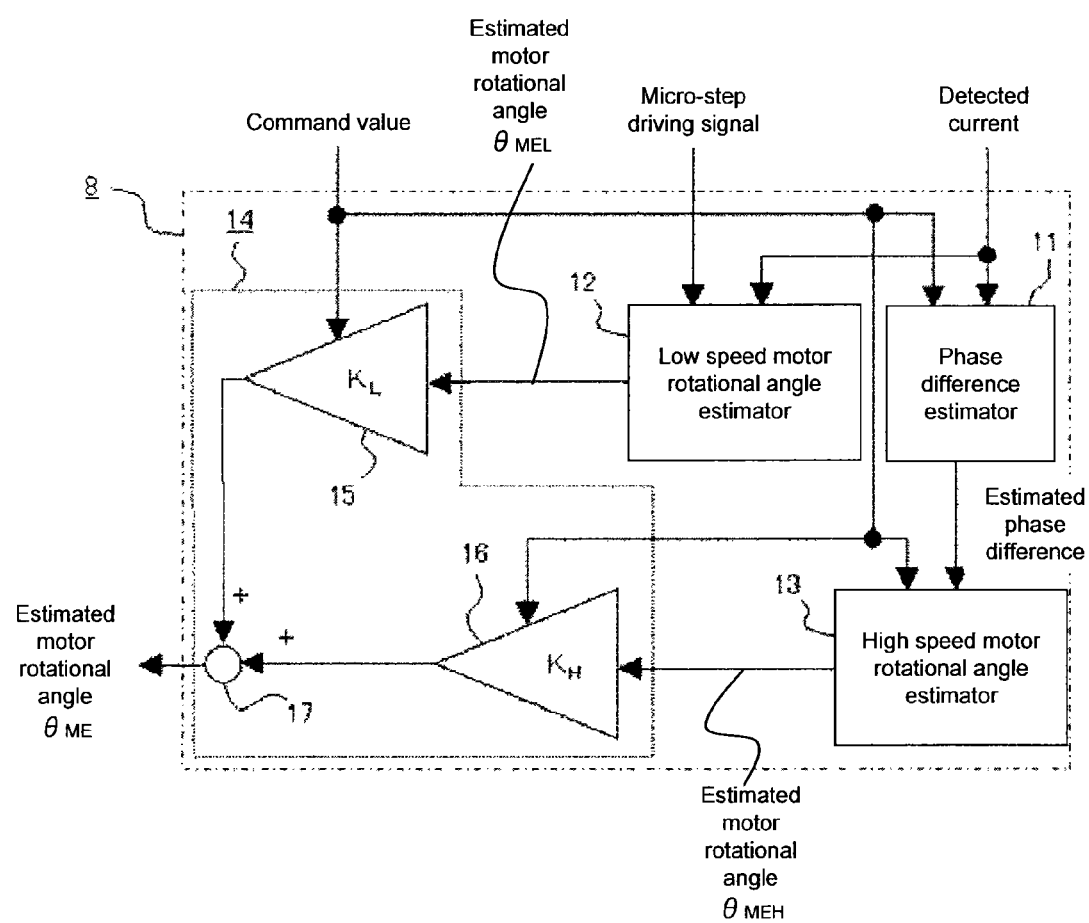
FIG. 2 is a block diagram showing details of a motor rotational angle estimator of the micro-step driving control apparatus for the stepping motor, according to Embodiment 1 of the present invention.

FIG. 1 is a block diagram showing a configuration of a micro-step driving control apparatus 2 for a stepping motor 1, according to Embodiment 1, and FIG. 2 is a block diagram showing details of a motor rotational angle estimator 8 of the apparatus.

First, the configuration of the micro-step driving control apparatus 2 for the stepping motor 1, according to Embodiment 1, will be described with reference to FIGS. 1 and 2.

In FIG. 1, the micro-step driving control apparatus 2 for the stepping motor 1 is comprised of a driver 3 for driving to rotate the stepping motor 1 by applying excitation current to respective phases of the stepping motor 1; a control circuit 4 for generating a micro-step driving signal and for outputting the signal to the driver 3; a command value generator 5 for generating a command value of rotational angle/rotational angular speed for the stepping motor 1 and outputting the value to the control circuit 4; a current detector 6 for detecting actual current applied to the stepping motor 1 by the driver 3 and outputting the detected current; and an estimation calculator 7 for outputting compensation signals to the control circuit 4 based on the detected current, the command value, and the micro-step driving signal.

The estimation calculator 7 is actually configured with an arithmetic processing unit such as a microcomputer, and is comprised of the motor rotational angle estimator 8 that estimates a motor rotational angle based on the detected current, the command value, and the micro-step driving signal; a detent torque estimator 9 that estimates present detent torque based on the motor rotational angle which has been estimated ("estimated motor rotational angle $\theta_{ME}$" hereinafter); and a compensation signal generator 10 that generates the compensation signals for compensating detent torque based on the detent torque which has been estimated ("estimated detent torque" hereinafter) and the estimated motor rotational angle $\theta_{ME}$ and that outputs the signal to the control circuit 4.

In FIG. 2, the motor rotational angle estimator 8 is comprised of a phase difference estimator 11 for estimating a phase difference between the command value and the detected current based on the command value and the detected current; a low-speed motor rotational angle estimator 12 for estimating a motor rotational angle when the stepping motor rotates at a low speed, based on the micro-step driving signal and the detected current; a high-speed motor rotational angle estimator 13 for estimating a motor rotational angle when the stepping motor rotates at a high speed, based on the phase difference estimated by the phase difference estimator 11 ("estimated phase difference" hereinafter) and the command value; and an addition unit 14 for outputting the estimated motor rotational angle $\theta_{ME}$ based on the estimated motor rotational angle when the stepping motor rotates at a low speed ("estimated motor rotational angle $\theta_{MEL}$" hereinafter), the estimated motor rotational angle when the stepping motor rotates at a high speed ("estimated motor rotational angle $\theta_{MEH}$" hereinafter), and the command value.

The addition unit 14 is configured with a low-speed estimated rotational angle amplifier 15 to which the estimated motor rotational angle $\theta_{MEL}$ and the command value are inputted and which outputs a value calculated by multiplying the estimated motor rotational angle $\theta_{MEL}$ by a low-speed estimated angle gain $K_L$ whose amplifying value varies according to the command value; a high-speed estimated rotational angle amplifier 16 to which the estimated motor rotational angle $\theta_{MEH}$ and the command value are inputted and which outputs a value calculated by multiplying the estimated motor rotational angle $\theta_{MEH}$ by a high-speed estimated angle gain $K_H$ whose amplifying value varies according to the command value; and an adder 17 which calculates the estimated motor rotational angle $\theta_{ME}$ by adding an output from the low-speed estimated rotational angle amplifier 15 to an output from the high-speed estimated rotational angle amplifier 16.

Next, operation of each block in FIGS. 1 and 2 will be described with reference to FIGS. 1 and 2.

Here, descriptions on operation of the stepping motor 1, the driver 3, and the command value generator 5 will be skipped since the operation thereof is similar to that used in a general micro-step driving control apparatus for a stepping motor. Also, while descriptions will be made hereinafter for a two-phase type stepping motor as a target for the stepping motor 1 for ease of understanding, the target is not limited to this type and stepping motors having the number of phases such as one or no less than three can be also targeted. The following descriptions in which the two-phase type stepping motor is targeted can be easily extended to stepping motors having the number of phases such as one or no less than three.

The current detector 6 is a detector for detecting actual current applied to the respective phases of the stepping motor 1, and a current detection technology can be used for the current detector 6, such as a Hall effect utilizing current sensor which is generally used for the current detection and a resistor whose temperature-resistance coefficient is adjusted for the current detection.

The low-speed motor rotational angle estimator 12 estimates a motor rotational angle based on Formula 1 and Formula 2 which are basic voltage equations for the two-phase type stepping motor 1.

$$L \cdot \dot{I}_A + R \cdot I_A = V_A + V_{A\omega} \quad \text{(Formula 1)}$$

$$L \cdot \dot{I}_B + R \cdot I_B = V_B + V_{B\omega} \quad \text{(Formula 2)}$$

Where, $I_A$: current passing through A-phase winding, $I_B$: current passing through B-phase winding, $V_A$: micro-step driving voltage signal for A-phase winding and $V_B$: micro-step driving voltage signal for B-phase winding, each of which is outputted from driver 3 to stepping motor 1, $V_{A\omega}$: velocity induced voltage induced in A-phase winding, $V_{B\omega}$: velocity induced voltage induced in B-phase winding, L: inductance of stepping motor 1, and R: winding resistance of stepping motor 1. The velocity induced voltage $V_{A\omega}$ in the A-phase winding and the velocity induced voltage $V_{B\omega}$ in the B-phase winding are expressed in Formula 3 and Formula 4, respectively.

$$V_{A\omega} = K_E \cdot \dot{\theta}_M \cdot \sin\left\{\frac{\pi}{2}\left(\frac{\theta_M}{\lambda} + \frac{1}{2}\right)\right\}$$ (Formula 3)

$$V_{B\omega} = K_E \cdot \dot{\theta}_M \cdot \sin\left\{\frac{\pi}{2}\left(\frac{\theta_M}{\lambda} - \frac{1}{2}\right)\right\}$$ (Formula 4)

Where, $K_E$: induced voltage constant of stepping motor 1, $\theta_M$: rotational angle of stepping motor 1, and $\lambda$: fundamental step angle of stepping motor 1. A relationship shown in Formula 5 is obtained by calculating a ratio of the velocity induced voltage $V_{A\omega}$ in the A-phase winding to the velocity induced voltage $V_{B\omega}$ in the B-phase winding from Formulas 1 and 2 using the Laplacian operator s.

$$\frac{V_{B\omega}}{V_{A\omega}} = \frac{(L \cdot s + R) \cdot I_A - V_A}{(L \cdot s + R) \cdot I_B - V_B}$$ (Formula 5)

By dividing each of the denominator and the numerator of the right-hand member by (L*s+R), Formula 5 can be changed to Formula 6.

$$\frac{V_{B\omega}}{V_{A\omega}} = \frac{I_A - \frac{V_A}{L \cdot s + R}}{I_B - \frac{V_B}{L \cdot s + R}}$$ (Formula 6)

Meanwhile, a relationship shown in Formula 7 is obtained by similarly calculating a ratio of the velocity induced voltage $V_{A\omega}$ in the A-phase winding to the velocity induced voltage $V_{B\omega}$ in the B-phase winding from Formulas 3 and 4.

$$\frac{V_{B\omega}}{V_{A\omega}} = \tan\left\{\frac{\pi}{2}\left(\frac{\theta_M}{\lambda} - \frac{1}{2}\right)\right\}$$ (Formula 7)

As a formula for calculating the estimated value $\theta_{MEL}$ of the motor rotational angle $\theta_M$, Formula 8 is obtained from Formulas 6 and 7.

$$\theta_{MEL} = \frac{2\lambda}{\pi}\left(\tan^{-1}\left(\frac{I_A - I_{A0}}{I_B - I_{B0}}\right) + \frac{\pi}{4}\right)$$ (Formula 8)

Where, $I_{A0}$ and $I_{B0}$ are expressed in the following Formula 9 and Formula 10, respectively.

$$I_{A0} = \frac{V_A}{L \cdot s + R}$$ (Formula 9)

$$I_{B0} = \frac{V_B}{L \cdot s + R}$$ (Formula 10)

By substituting an actual current (detected current) value in the A-phase and an actual current (detected current) value in the B-phase which are detected by the current detector 6 into $I_A$ and $I_B$, respectively, and by substituting an micro-step driving signal for the A-phase and an micro-step driving signal for the B-phase which are outputted from the driver 3 into $V_A$ and $V_B$, respectively, an estimated motor rotational angle $\theta_{MEL}$ which is an estimated value of a present rotational angle $\theta_M$ of the stepping motor 1 can be calculated using relational expressions shown in Formulas 8, 9, and 10.

However, the estimated motor rotational angle $\theta_{MEL}$ has a slight phase lag relative to the motor rotational angle $\theta_M$ due to the influence of a low-pass filter which is used together with the current detector 6 for blocking high-frequency noise, and of coil inductance L and winding resistance R of the stepping motor 1. While the phase lag does not influence compensation for detent torque when the rotational speed of the stepping motor 1 is low, the phase lag influences greatly when the rotational speed becomes high.

The phase difference estimator 11 estimates a phase difference between a command value of the current and the detected current. First, based on Formula 11, an applied current value $I_0$ is calculated from the current $I_A$ passing through the A-phase winding and the current $I_B$ passing through the B-phase winding which are detected by the current detector 6.

$$I_0 = \sqrt{I_A^2 + I_B^2}$$ (Formula 11)

Here, an ideal current command wave form $I_A^*$ for the A-phase and an ideal current command wave form $I_B^*$ for the B-phase which have no phase lag are given in Formula 12 and Formula 13, respectively, based on a command value $\theta^*$ of the motor rotational angle.

$$I_A^* = \cos\left(\frac{\pi\theta^*}{2\lambda} + \frac{\pi}{4}\right)$$ (Formula 12)

$$I_B^* = \sin\left(\frac{\pi\theta^*}{2\lambda} + \frac{\pi}{4}\right)$$ (Formula 13)

Here, the current $I_A$ passing through the A-phase winding and the current $I_B$ passing through the B-phase winding are expressed in Formula 14 and Formula 15, respectively.

$$I_A = I_0 \cdot \cos\left(\frac{\pi\theta^*}{2\lambda} + \frac{\pi}{4} + \gamma\right)$$ (Formula 14)

$$I_B = I_0 \cdot \sin\left(\frac{\pi\theta^*}{2\lambda} + \frac{\pi}{4} + \gamma\right)$$ (Formula 15)

Where, $\gamma$ is a phase difference between the command value of the current and the detected current.

By calculating Formula 16 using relational expressions shown in Formulas 12, 13, 14, and 15, an estimated value of the phase difference (estimated phase difference $\gamma$) between the command value of the current and the detected current can be calculated.

$$\gamma = \cos^{-1}\left(I_A^* \cdot \frac{I_A}{I_0} + I_B^* \cdot \frac{I_B}{I_0}\right)$$ (Formula 16)

The high-speed motor rotational angle estimator 13 estimates a motor rotational angle based on the estimated phase difference $\gamma$ calculated by the phase difference estimator 11.

The current $I_A$ passing through the A-phase winding and the current $I_B$ passing through the B-phase winding are expressed in Formula 17 and Formula 18, respectively, if they are written using a deviation $\Delta\theta$ between the command value $\theta^*$ of the motor rotational angle and the actual motor rotational angle $\theta_M$.

$$I_A = I_0 \cdot \cos\left(\frac{\pi}{2\lambda}(\theta^* + \Delta\theta) + \frac{\pi}{4}\right) \quad \text{(Formula 17)}$$

$$I_B = I_0 \cdot \sin\left(\frac{\pi}{2\lambda}(\theta^* + \Delta\theta) + \frac{\pi}{4}\right) \quad \text{(Formula 18)}$$

Here, Formula 19 is obtained from relational expressions shown in Formulas 14, 15, 17, and 18. The deviation $\Delta\theta$ of the motor rotational angle which corresponds to the estimated phase difference $\gamma$ can be calculated from Formula 19.

$$\Delta\theta = \frac{2\lambda}{\pi}\gamma \quad \text{(Formula 19)}$$

By applying the deviation $\Delta\theta$ of the motor rotational angle calculated in Formula 19 to the relational expression shown in Formulas 20, the estimated motor rotational angle $\theta_{MEH}$ which is an estimated value of the present motor rotational angle $\theta_M$ can be calculated.

$$\theta_{MEH} = \theta^* - \Delta\theta \quad \text{(Formula 20)}$$

When the stepping motor rotates at a low speed, since the estimated phase difference $\gamma$ to be used for calculating the estimated value $\theta_{ME}$ of the motor rotational angle is a very small value which is easily influenced by the noise, etc., it is difficult to increase estimation accuracy. Therefore, when the stepping motor 1 rotates at a low speed at which the estimated phase difference $\gamma$ cannot be calculated with appropriate accuracy, accuracy of the estimated motor rotational angle $\theta_{MEH}$ which is calculated using the estimated phase difference $\gamma$ is lower in comparison with accuracy of the estimated motor rotational angle $\theta_{MEL}$ which is calculated without using the estimated phase difference $\gamma$. Meanwhile, when the stepping motor rotates at a high speed, since the phase difference becomes sufficiently large enough to calculate the estimated value $\theta_{ME}$, the estimated motor rotational angle $\theta_{MEH}$ can be calculated with high accuracy for a high rotational speed.

The low-speed estimated rotational angle amplifier 15 amplifies the low-speed estimated motor rotational angle $\theta_{MEL}$ by an appropriate gain according to the command value. Also, the high-speed estimated rotational angle amplifier 16 amplifies the high-speed estimated motor rotational angle $\theta_{MEH}$ by an appropriate gain according to the command value. The amplification by an appropriate gain means amplification which satisfies the relationship shown in Formula 21, and the estimated motor rotational angle $\theta_{ME}$ which is an output from the motor rotational angle estimator 8 is calculated from the estimated value of the estimated motor rotational angle $\theta_{MEL}$ and the estimated value of the estimated motor rotational angle $\theta_{MEH}$.

$$\theta_{ME} = (1-\rho(\dot{\theta}^*)) \cdot \theta_{MEL} + \rho(\dot{\theta}^*) \cdot \theta_{MEH} \quad \text{(Formula 21)}$$

Where, a coefficient $(1-\rho(d\theta/dt^*))$ for $\theta_{MEL}$ in the first term of the right-hand member in Formula 21 is the low-speed estimated angle gain $K_L$, and a coefficient $\rho(d\theta/dt^*)$ for $\theta_{MEH}$ in the second term of the right-hand member in Formula 21 is the high-speed estimated angle gain $K_H$. Also, the coefficient $\rho(d\theta/dt^*)$ is a function of a motor angular speed command value $d\theta/dt^*$ and is set so as to satisfy Formula 22.

$$\rho(\dot{\theta}^*) = \begin{cases} 0 & (\dot{\theta}^* \approx 0) \\ 0 \sim 1 & (0 < \dot{\theta}^* < \omega) \\ 1 & (\dot{\theta}^* \approx \omega) \end{cases} \quad \text{(Formula 22)}$$

Where, $\omega$ is an angular speed at which an error for the estimated value of the motor rotational angle $\theta_{MEL}$ becomes prominent, and is set by, for example, an angular speed $\Omega_c = R/L$ calculated from the inductance L and winding resistance R of the stepping motor 1, or the like. As a function for the coefficient $\rho(d\theta/dt^*)$ which satisfies Formula 22, various types can be assumed and the function can be designed according to driving conditions and characteristics of the motor to be used.

As shown in Formulas 21 and 22, by calculating the estimated motor rotational angle $\theta_{ME}$ using the low-speed estimated angle gain $K_L$ and the high-speed estimated angle gain $K_H$, an estimated value which is asymptotic to a value of the estimated motor rotational angle $\theta_{MEL}$ can be outputted when the motor angular speed is sufficiently low, and an estimated value which is asymptotic to a value of the estimated motor rotational angle $\theta_{MEH}$ can be outputted when the motor angular speed is high. Therefore, it is always possible to estimate the motor rotational angle with high accuracy regardless of magnitude of the motor angular speed. In addition, the apparatus is not configured to select and output either one of the estimated motor rotational angle $\theta_{MEL}$ or the estimated motor rotational angle $\theta_{MEH}$ according to the motor angular speed, but is configured to output an angle obtained by mixing the two angles at an appropriate rate, so that the estimated motor rotational angle $\theta_{ME}$ does not change discontinuously when the motor angular speed varies.

The detent torque estimator 9 calculates, using the estimated motor rotational angle $\theta_{ME}$ calculated by the motor rotational angle estimator 8, estimated detent torque $T_{ME}(\theta_M)$ which is an estimated value of detent torque at a rotational angle $\theta_M$ of the stepping motor 1, from Formula 23 which shows a first order component of the detent torque.

$$T_{ME}(\theta_M) \approx T_{M0} \cdot \sin\left(2\pi\frac{\theta_{ME}}{\lambda}\right) \quad \text{(Formula 23)}$$

Where, $T_{M0}$ is the maximum value of the detent torque which appears in a motor catalog, etc.

The compensation signal generator 10 generates compensation signals for excluding the influence of the estimated detent torque $T_{ME}$ calculated by the detent torque estimator 9 and for reducing torque fluctuations caused by the influence of the detent torque. The compensation signals generated by the compensation signal generator 10 are a compensation signal $\Delta V_A$ for the A-phase winding and a compensation signal $\Delta V_B$ for the B-phase winding which are calculated, based on Formula 24 and Formula 25, respectively, using the estimated detent torque $T_{ME}$ calculated by the detent torque estimator 9 and the estimated motor rotational angle $\theta_{ME}$ calculated by the motor rotational angle estimator 8.

$$\Delta V_A = -\frac{T_{ME}}{K_T}\left\{R\cdot\sin\alpha\cdot\sin\beta + \frac{\pi\cdot L\cdot\dot{\theta}_{ME}}{\lambda}\left(2\cos\alpha\cdot\sin\beta + \frac{1}{2}\sin\alpha\cdot\cos\beta\right)\right\}$$ (Formula 24)

$$\Delta V_B = \frac{T_{ME}}{K_T}\left\{R\cdot\sin\alpha\cdot\cos\beta + \frac{\pi\cdot L\cdot\dot{\theta}_{ME}}{\lambda}\left(2\cos\alpha\cdot\cos\beta - \frac{1}{2}\sin\alpha\cdot\sin\beta\right)\right\}$$ (Formula 25)

Where, $K_T$ is a torque constant of the stepping motor 1, and a variable $\alpha$ and a variable $\beta$ are expressed in Formula 26 and Formula 27, respectively.

$$\alpha = 2\pi\frac{\theta_{ME}}{\lambda}$$ (Formula 26)

$$\beta = \frac{\pi}{2}\left(\frac{\theta_{ME}}{\lambda} + \frac{1}{2}\right)$$ (Formula 27)

The control circuit 4 generates, as shown in Formula 28 and Formula 29, the micro-step driving signal $V_A$ for the A-phase and the micro-step driving signal $V_B$ for the B-phase by adding a driving signal $V_{A0}$ for the A-phase and a driving signal $V_{B0}$ for the B-phase which are fundamental sinusoidal signals of the micro-step driving signal, to the compensation signal $\Delta V_A$ for the A-phase winding and the compensation signal $\Delta V_B$ for the B-phase winding, respectively, which are generated by the compensation signal generator 10. Then, the generated driving signal $V_A$ for the A-phase and driving signal $V_B$ for the B-phase are transmitted to the driver 3.

$$V_A = V_{A0} + \Delta V_A$$ (Formula 28)

$$V_B = V_{B0} + \Delta V_B$$ (Formula 29)

When the compensation signal $\Delta V_A$ for the A-phase winding and the compensation signal $\Delta V_B$ for the B-phase winding contained in the driving signal $V_A$ for the A-phase and the driving signal $V_B$ for the B-phase, respectively, which are transmitted to the driver 3, are applied to the stepping motor 1 by the driver 3, compensation current $\Delta I_A$ for the A-phase winding and compensation current $\Delta I_B$ for the B-phase winding which are expressed in Formula 30 and Formula 31, respectively, are passing through the respective phase windings of the stepping motor 1.

$$\Delta I_A = \frac{\Delta V_A}{L\cdot s + R} = -\frac{T_{ME}}{K_T}\sin\alpha\cdot\sin\beta$$ (Formula 30)

$$\Delta I_B = \frac{\Delta V_B}{L\cdot s + R} = \frac{T_{ME}}{K_T}\sin\alpha\cdot\cos\beta$$ (Formula 31)

When the compensation current $\Delta I_A$ for the A-phase winding and the compensation current $\Delta I_B$ for the B-phase winding are applied to the stepping motor 1, compensation torque $\Delta\tau$ is generated in the stepping motor 1. The compensation torque $\Delta\tau$ generated at this time can be calculated by Formula 32 which shows a relationship between applied current and output torque $\tau$ in a two-phase type stepping motor.

$$\tau = -K_T\cdot\left\{I_A\cdot\sin\left(\frac{\pi}{2}\left(\frac{\theta_M}{\lambda} + \frac{1}{2}\right)\right) + I_B\cdot\sin\left(\frac{\pi}{2}\left(\frac{\theta_M}{\lambda} - \frac{1}{2}\right)\right)\right\}$$ (Formula 32)

Specifically, Formula 33 for calculating the compensation torque $\Delta\tau$ can be obtained by substituting the compensation current $\Delta I_A$ for the A-phase winding and the compensation current $\Delta I_B$ for the B-phase winding which are calculated by Formula 30 and Formula 31 into the current $I_A$ for the A-phase winding and the current $I_B$ for the B-phase winding in Formula 32, respectively.

$$\Delta\tau = T_{ME}\cdot\sin\alpha$$ (Formula 33)

The compensation torque $\Delta\tau$ calculated by Formula 33 coincides with the estimated detent torque $T_{ME}$ shown in Formula 23, which is calculated by the detent torque estimator 9. Therefore, by driving to rotate the stepping motor 1 based on the compensation signal $\Delta V_A$ for the A-phase winding and the compensation signal $\Delta V_B$ for the B-phase winding which are generated by the compensation signal generator 10, the compensation torque $\Delta\tau$ for canceling the estimated detent torque $T_{ME}$ calculated by the detent torque estimator 9 is generated in the motor 1, so that fluctuating torque caused by the influence of the detent torque is reduced.

As described in Embodiment 1, the micro-step driving control apparatus 2 for the stepping motor 1 is comprised of a driver 3 for driving the stepping motor 1; a control circuit 4 for supplying a micro-step driving signal to the driver 3; a command value generator 5 for supplying a command value to the control circuit 4; a current detector 6 for detecting actual current passing through the stepping motor 1; a phase difference estimator 11 for calculating, based on the command value and detected current detected by the current detector 6, an estimated phase difference between the command value and the detected current; a low-speed motor rotational angle estimator 12 for calculating, based on the detected current and the micro-step driving signal, an estimated motor rotational angle $\theta_{MEL}$ when the stepping motor 1 rotates at a speed too low to calculate the estimated phase difference with appropriate accuracy; a high-speed motor rotational angle estimator 13 for calculating, based on the estimated phase difference and the command value, an estimated motor rotational angle $\theta_{MEH}$ when the stepping motor 1 rotates at a high speed; an addition unit 14 for calculating, based on a low-speed estimated angle gain $K_L$ and a high-speed estimated angle gain $K_H$ each of whose amplifying value varies according to the command value, an estimated motor rotational angle $\theta_{ME}$ by mixing the estimated motor rotational angle $\theta_{MEL}$ and the estimated motor rotational angle $\theta_{MEH}$ at an appropriate rate; a detent torque estimator 9 for calculating, based on the estimated motor rotational angle $\theta_{ME}$, estimated detent torque; and a compensation signal generator 10 for generating compensation signals based on the estimated detent torque and the estimated motor rotational angle $\theta_{ME}$.

By employing the configuration described above, since no prior work such as measurement of corrective current values by performing preliminary driving is necessary for reducing torque fluctuations caused by the influence of detent torque, work for measuring corrective current values prior to the use of motors can be skipped, so that the time for developing a driving system for motors can be shortened.

Also, since corrective current values stored in a storage medium in advance are not used for controlling compensation current by reading out the values as the time passes from the driving start point of the motor, as was done in the past, but compensation current is applied to the stepping motor 1 based on compensation signals calculated while the stepping motor 1 is driven to rotate, it is always possible to reduce torque fluctuations caused by the influence of detent torque even if driving conditions for the stepping motor 1 are changed due to long-term change etc. of friction torque. Therefore, the micro-step driving control apparatus 2 according to the configuration in Embodiment 1 can be used under a wide range of driving conditions for the stepping motor 1.

In addition, since the apparatus is configured such that compensation signals are always generated while the stepping motor 1 is driven to rotate and compensation current necessary for compensating detent torque is applied based on the compensation signals, even if driving conditions for the stepping motor 1 such as friction torque are changed while the stepping motor 1 is driven to rotate, compensation signals can be generated in real time in response to the change in driving conditions. Therefore, it is always possible to reduce torque fluctuations caused by the influence of detent torque even if driving conditions for the stepping motor 1 are rapidly changed.

Furthermore, since the motor rotational angle estimator 8 is not configured to select either one of the estimated motor rotational angle $\theta_{MEL}$ or the estimated motor rotational angle $\theta_{MEH}$ each of which are calculated using individual estimators, but is configured to calculate an estimated motor rotational angle $\theta_{ME}$ by mixing the two angles at an appropriate rate, estimated values are continuous and without discontinuity from a low speed rotation through a high speed rotation, thereby being able to estimate a motor rotational angle $\theta_M$ with high accuracy. Therefore, detent torque can be compensated with high accuracy over the range from a low speed rotation through a high speed rotation of the stepping motor, without depending on the rotational speed. Thus, the micro-step driving control apparatus 2 according to the configuration in Embodiment 1 can be used under a wide range of driving conditions for the stepping motor 1.

Embodiment 2

While the configuration is described in Embodiment 1 in which Formula 23 that shows a first order component of detent torque is used for calculating estimated detent torque by the detent torque estimator 9, it is not limited thereto and a configuration may be employed in which an estimation formula is used that has higher order components of the detent torque. In Embodiment 2, a configuration will be described, as a representative case, in which an estimation formula is used that has up to n-th order components (n>2) of the detent torque in addition to the first order component. Here, since a configuration other than employing the estimation formula which has the higher order components of the detent torque is similar to that in Embodiment 1, description thereof will be skipped.

The estimation formula having up to n-th order components of the detent torque in addition to the first order component can be expressed in Formula 34.

$$T_{ME} = T_{M0} \cdot \sin\alpha + \sum_{k=1}^{n} T_{Mk} \cdot \sin k\alpha \quad \text{(Formula 34)}$$

Where, $T_{Mk}$ is amplitude of a k-th order component of the detent torque.

If the first order component through an m-th order component of the detent-torque amplitude characteristics of the stepping motor 1 are defined as specification values of the motor, torque fluctuations caused by the influence of the first order through the m-th order components of the detent torque can be reduced by applying the first order through the m-th order components of the specification values to Formula 34. That is, since torque fluctuations caused by the influence of higher order components within the range of detent torque characteristics defined as the motor specification values can be reduced, the detent torque can be compensated with higher accuracy.

Also, it is needless to mention that operations and effects similar to those in Embodiment 1 can be obtained, in addition to thus being able to reduce the torque fluctuations caused by the influence of the detent torque of the higher order components.

In addition, even if the amplitude characteristics of the detent torque of the second order component or more are not defined as the specification values of the motor, amplitude of each of rotational components can be calculated by performing preliminary driving before using the stepping motor 1, obtaining torque fluctuation data during the rotation of the motor, and performing frequency analysis on the data. In this case, although the preliminary driving before using the motor is necessary, since detailed measurement of characteristics of the detent torque for each of rotational angles, as was done in the past, is not necessary, the time is very short which is needed for the preliminary driving and amplitude measurement of the higher order components.

Embodiment 3

Figure 3:
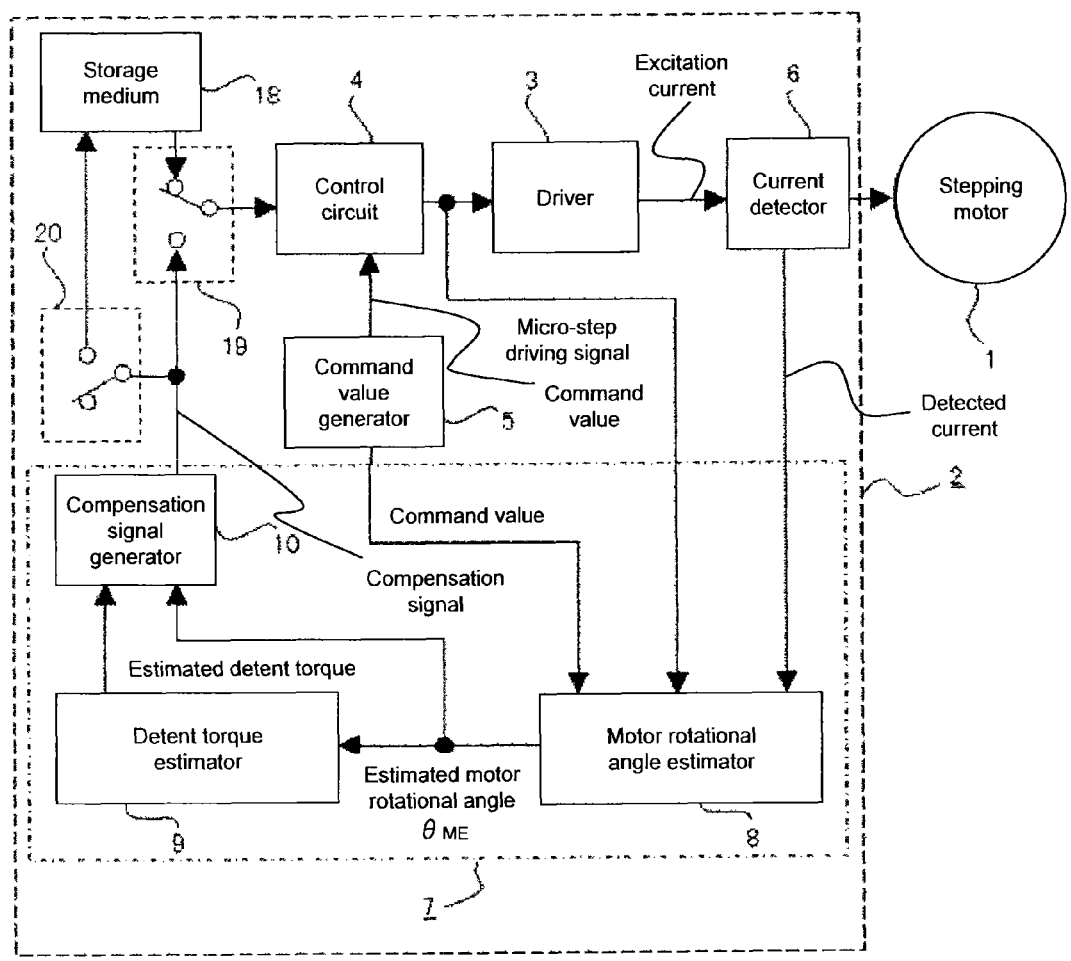
FIG. 3 is a block diagram showing a configuration of a micro-step driving control apparatus for a stepping motor, according to Embodiment 3 of the present invention.

While the configuration is employed in Embodiments 1 and 2 in which compensation signals are always supplied from the estimation calculator 7 to the control circuit 4, it is not limited thereto and a configuration may be employed in which either one of compensation signals outputted from the estimation calculator 7 or compensation signals stored in a storage medium in advance is arbitrarily selected and used, as shown in FIG. 3.

First, a configuration of Embodiment 3 will be described with reference to FIG. 3. FIG. 3 is a block diagram showing a configuration of a micro-step driving control apparatus 2 for a stepping motor 1, according to Embodiment 3, and a storage medium 18, a first switch 19, and a second switch 20 are added to the configuration shown in FIG. 1. The storage medium 18 stores thereinside, via the second switch 20, compensation signals generated by the compensation signal generator 10, and outputs the stored compensation signals to the control circuit 4 via the first switch 19. The first switch 19 selects compensation signals to be outputted to the control circuit 4 out of the compensation signals from the compensation signal generator 10 and the stored compensation signals from the storage medium 18. The second switch 20 controls timing for outputting the compensation signals outputted by the compensation signal generator 10 to the storage medium 18. Since other portions in the configuration are similar to those in Embodiment 1 or 2, description thereof will be skipped.

Figure 4:
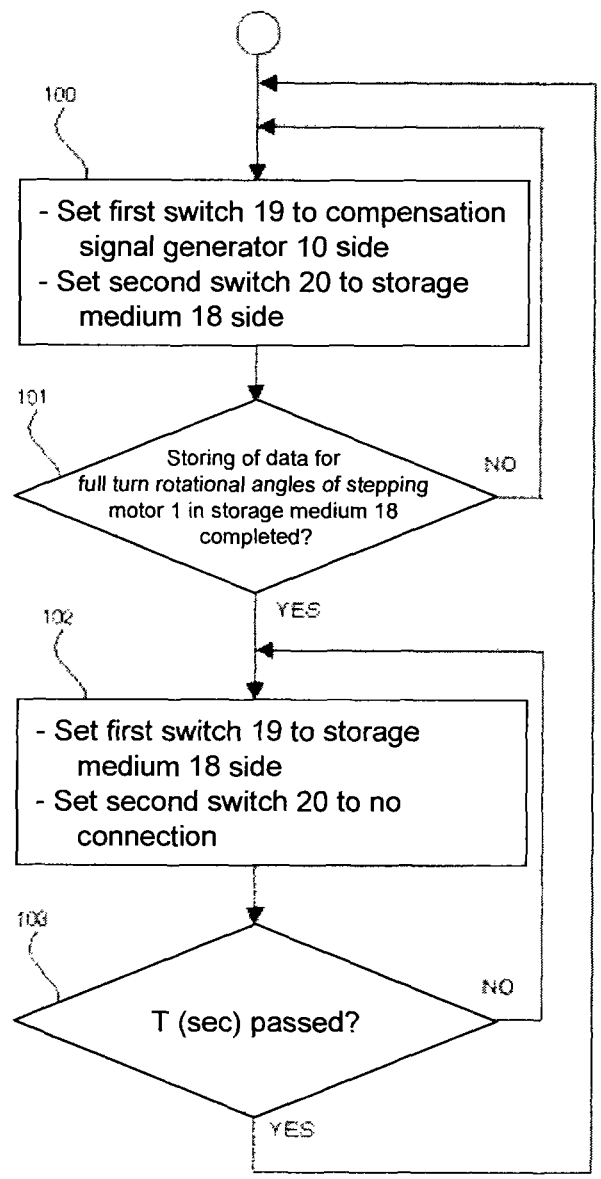
FIG. 4 is a flow chart showing an operation flow of the micro-step driving control apparatus for the stepping motor, according to Embodiment 3 of the present invention.

Next, operation of the micro-step driving control apparatus 2 for the stepping motor 1, according to Embodiment 3, will be described with reference to FIGS. 3 and 4. FIG. 4 is a flow chart showing operation of the first switch 19 and the second switch 20.

As shown in FIG. 4, in a first step 100, the first switch 19 is changed over so that the compensation signals from the compensation signal generator 10 are outputted to the control circuit 4, and at the same time, the second switch 20 is changed over so that the compensation signals from the compensation signal generator 10 are outputted to and stored in the storage medium 18. Here, the compensation signals supplied to the control circuit 4 are signals outputted from the compensation signal generator 10 in real time, and the same signals are also stored in the storage medium 18 with the passage of time.

Next, in a second step 101, it is determined whether or not storing of the compensation signals for a full turn of the motor rotational angle in the storage medium 18 is completed. When determined that the storing is not completed in the determination, processing for the storing is continued. When determined that the storing is completed, it proceeds to a third step 102.

In the third step 102, writing on the storage medium 18 is stopped by changing over the first switch 19 so that the stored compensation signals in the storage medium 18 are outputted to the control circuit 4, and at the same time, changing over the second switch 20 so that the real time compensation signals from the compensation signal generator 10 are not outputted to the storage medium 18. After changing over these switches, calculation processing in the estimation calculator 7 is stopped and the compensation signals read out from the storage medium 18 are outputted to the control circuit 4.

After that, in a forth step 103, whether or not a specific time T (sec) has passed after executing the third step 102 is determined, and if determined that the specific time T has passed, it returns to the first step 100. And then, the calculation processing in the estimation calculator 7 is restarted and the compensation signals are again outputted from the compensation signal generator 10.

Here, since operations of other components such as the driver 3, the command value generator 5, and the current detector 6 are similar to those in Embodiment 1, description thereof will be skipped.

In Embodiment 3, as described above, it is possible to cease calculation in the estimation calculator 7 during the time for executing the forth step 103, out of the time for driving to rotate the stepping motor 1. Therefore, calculation loads that burden an arithmetic processing unit such as a microcomputer, which actually executes the calculation processing in the estimation calculator 7, can be reduced. Especially, in a case when the calculation loads of the arithmetic processing unit increase, i.e. when the stepping motor 1 is driven to rotate at a high speed, an advantage can be obtained that eliminates the need for using an arithmetic processing unit having high processing capability, owing to the effect of reducing the calculation loads.

Also, except that time responsiveness of "the effect of reducing torque fluctuations caused by a change of driving conditions for the stepping motor 1 which has a rapid temporal change" described in Embodiment 1 decreases by an amount corresponding to the specific time T, it is needless to mention that operations and effects similar to those in Embodiment 1 can be obtained, in addition to such effect of reducing the calculation loads.

Embodiment 4

Figure 5:
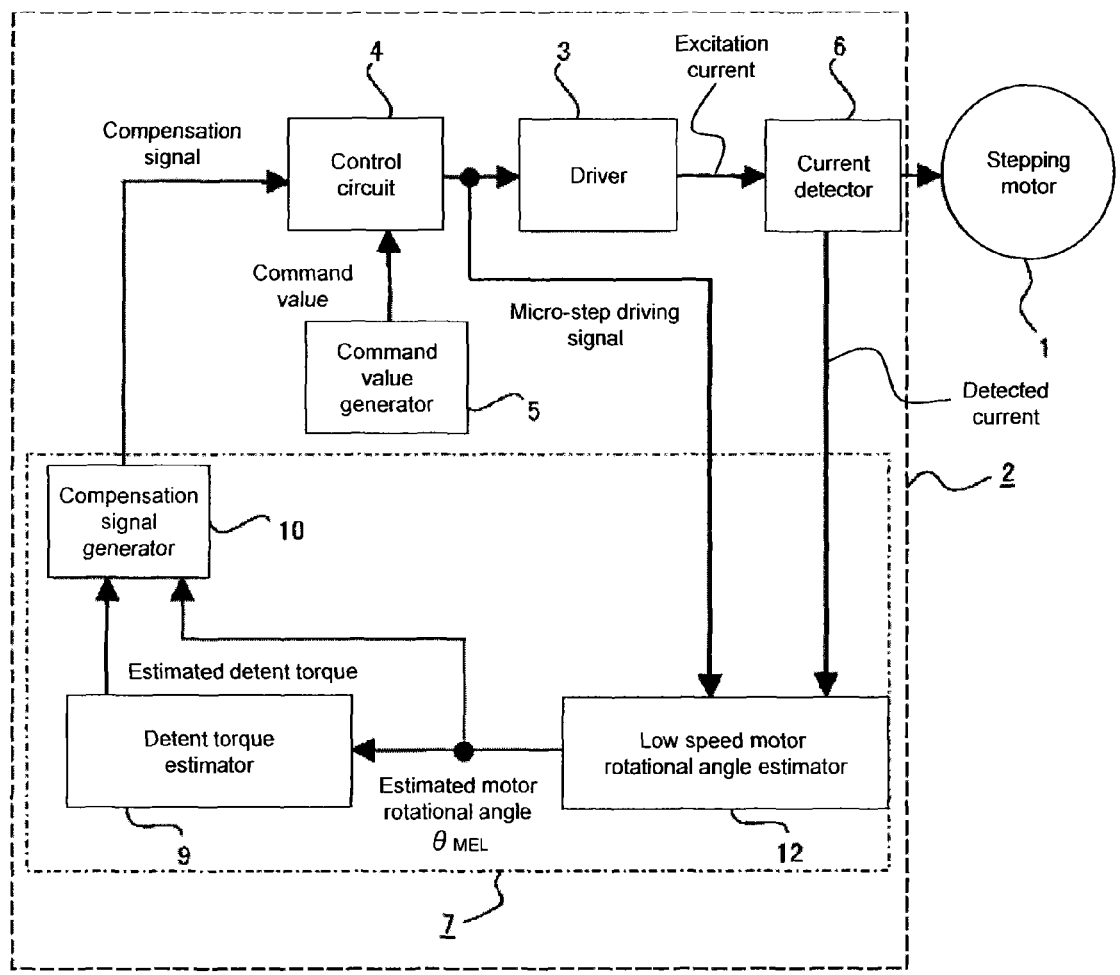
FIG. 5 is a block diagram showing a configuration of a micro-step driving control apparatus for a stepping motor, according to Embodiment 4 of the present invention.

While the configuration is employed in Embodiments 1 through 3 in which an estimated motor rotational angle $\theta_{ME}$ is calculated using simultaneously both of the low-speed motor rotational angle estimator 12 and the high-speed motor rotational angle estimator 13 as the motor rotational angle estimator 8, it is not limited thereto and a configuration may be employed in which only the low-speed motor rotational angle estimator 12 is used, as shown in FIG. 5.

First, a configuration of Embodiment 4 will be described with reference to FIG. 5. FIG. 5 is a block diagram showing a configuration of a micro-step driving control apparatus 2 for a stepping motor 1, according to Embodiment 4. In the configuration in Embodiment 4, the low-speed motor rotational angle estimator 12 is employed in place of the motor rotational angle estimator 8 in the configuration shown in FIG. 1. Here, a micro-step driving signal generated by the control circuit 4 and detected current detected by the current detector 6 are inputted to the low-speed motor rotational angle estimator 12. And the apparatus is configured such that an estimated motor rotational angle $\theta_{MEL}$ calculated by the low-speed motor rotational angle estimator 12 is outputted to the detent torque estimator 9 and the compensation signal generator 10. Since other portions in the configuration are similar to those in any one of Embodiments 1 through 3, description thereof will be skipped.

Next, operation of the micro-step driving control apparatus 2 for the stepping motor 1, according to Embodiment 4, will be described with reference to FIG. 5.

As shown in FIG. 5, the low-speed motor rotational angle estimator 12 calculates, using relational expressions of Formulas 8, 9, and 10 shown in Embodiment 1, an estimated motor rotational angle $\theta_{MEL}$ which is an estimated value of a present rotational angle $\theta_M$ of the stepping motor 1 from detected current detected by the current detector 6 and the micro-step driving signal generated by the control circuit 4.

The estimated motor rotational angle $\theta_{MEL}$ calculated by the low-speed motor rotational angle estimator 12 coincides with a motor rotational angle $\theta_M$ with high accuracy without a phase delay to the motor rotational angle $\theta_M$ when a rotational speed of the motor is small enough to ignore the influence of delay caused by a low-pass filter which is used together with the current detector 6 for blocking high-frequency noise, and by coil inductance L and winding resistance R of the stepping motor 1.

Similarly to Embodiment 1, the detent torque estimator 9 estimates detent torque based on the estimated motor rotational angle $\theta_{MEL}$ calculated by the low-speed motor rotational angle estimator 12 and the compensation signal generator 10 generates compensation signals for canceling the estimated detent torque.

In Embodiment 4, as described above, a configuration is employed in which only the low-speed motor rotational angle estimator 12 is used as the motor rotational angle estimator 8. Therefore, since it is possible to reduce calculation to be executed by an arithmetic processing unit without providing the phase difference estimator 11, high-speed motor rotational angle estimator 13, and addition unit 14, an advantage can be obtained that eliminates the need to use an arithmetic processing unit having high processing capability.

Also, when a rotational speed of the motor is small enough to ignore the influence of delay caused by a low-pass filter which is used together with the current detector 6 for blocking high-frequency noise, and by coil inductance L and winding resistance R of the stepping motor 1, it is possible to reduce torque fluctuations caused by the influence of the detent torque without the need of prior work such as measurement of corrective current values by performing preliminary driving as was done in the past, in addition to the effect of reducing calculation loads as described above. Therefore, time for developing a driving system for motors can be shortened because work for measuring corrective current values prior to the use of the motors can be skipped.

Embodiment 5

Figure 6:
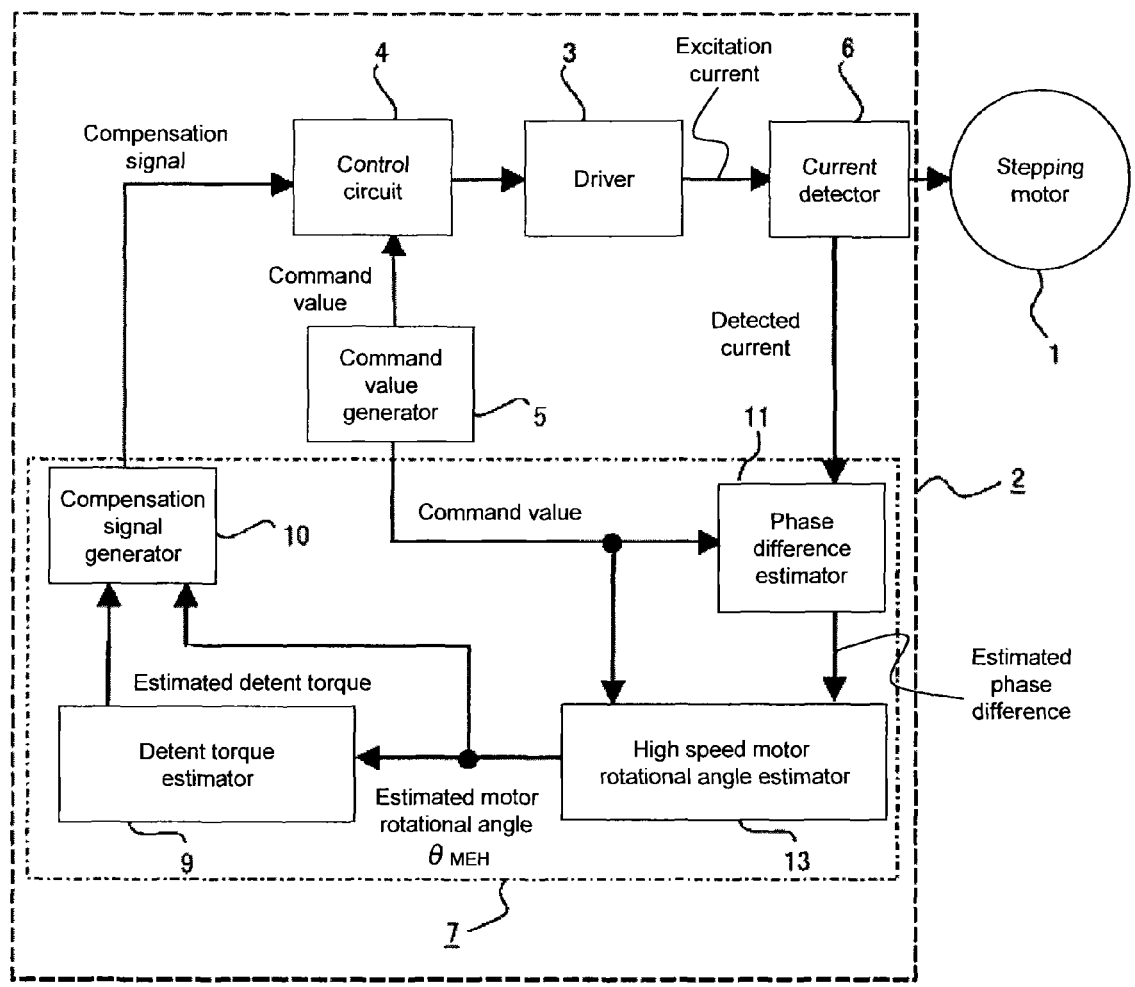
FIG. 6 is a block diagram showing a configuration of a micro-step driving control apparatus for a stepping motor, according to Embodiment 5 of the present invention.

While the configuration is employed in Embodiments 1 through 3 in which an estimated motor rotational angle $\theta_{ME}$ is calculated using simultaneously both of the low-speed motor rotational angle estimator 12 and the high-speed motor rotational angle estimator 13 as the motor rotational angle estimator 8, it is not limited thereto and a configuration may be employed in which the phase difference estimator 11 and only the high-speed motor rotational angle estimator 13 are used, as shown in FIG. 6.

First, a configuration of Embodiment 5 will be described with reference to FIG. 6. FIG. 6 is a block diagram showing a configuration of a micro-step driving control apparatus 2 for a stepping motor 1, according to Embodiment 5. In the configuration in Embodiment 5, the phase difference estimator 11 and the high-speed motor rotational angle estimator 13 are employed in place of the motor rotational angle estimator 8 in the configuration shown in FIG. 1. Here, the following process is employed: a command value of current outputted from the command value generator 5 and detected current detected by the current detector 6 are inputted to the phase difference estimator 11; the phase difference estimator 11 outputs an estimated phase difference calculated based on the command value and the detected current to the high-speed motor rotational angle estimator 13; the command value outputted from the command value generator 5 and the estimated phase difference calculated by the phase difference estimator 11 are inputted to the high-speed motor rotational angle estimator 13; and a motor rotational angle $\theta_{MEH}$ estimated by the high-speed motor rotational angle estimator 13 is outputted to the detent torque estimator 9 and the compensation signal generator 10. Since other portions in the configuration are similar to those in any one of Embodiments 1 through 3, description thereof will be skipped.

Next, operation of the micro-step driving control apparatus 2 for the stepping motor 1, according to Embodiment 5, will be described with reference to FIG. 6.

As shown in FIG. 6, the phase difference estimator 11 estimates, using relational expression of Formula 16 shown in Embodiment 1, a phase difference between the command value of current and the detected current, from the command value of current outputted from the command value generator 5 and the detected current detected by the current detector 6.

The high-speed motor rotational angle estimator 13 calculates, using relational expressions of Formulas 19 and 20 shown in Embodiment 1, an estimated motor rotational angle $\theta_{MEH}$ which is an estimated value of a present rotational angle $\theta_M$ of the stepping motor 1, from the estimated phase difference calculated by the phase difference estimator 11 and the command value outputted from the command value generator 5.

The estimated motor rotational angle $\theta_{MEH}$ calculated by the high-speed motor rotational angle estimator 13 coincides with the motor rotational angle $\theta_M$ with high accuracy when the motor rotates at a high speed in which the estimated phase difference value calculated by the phase difference estimator 11 is large enough to be not influenced by noise, etc.

Similarly to Embodiment 1, the detent torque estimator 9 estimates detent torque based on the estimated motor rotational angle $\theta_{MEH}$ calculated by the high-speed motor rotational angle estimator 13 and the compensation signal generator 10 generates compensation signals for canceling the estimated detent torque.

In Embodiment 5, as described above, the configuration is employed in which the phase difference estimator 11 and the high-speed motor rotational angle estimator 13 are used in place of the motor rotational angle estimator 8. Therefore, since it is possible to reduce calculation to be executed by an arithmetic processing unit by eliminating the low-speed motor rotational angle estimator 12 and addition unit 14, an advantage can be obtained that eliminates the need to use an arithmetic processing unit having high processing capability.

Also, when the motor rotates at a high speed at which the estimated phase difference value calculated by the phase difference estimator 11 is large enough to be not influenced by noise, etc., it is possible to reduce torque fluctuations caused by the influence of detent torque without the need of prior work such as measurement of corrective current values by performing preliminary driving as was done in the past, in addition to the effect of reducing calculation loads as described above. Therefore, time for developing a driving system for motors can be shortened because work for measuring corrective current values prior to the use of the motors can be skipped.

While the configurations in which Formula 23 or 34 is used for calculating estimated detent torque by the detent torque estimator 9 are described in the above embodiments, a configuration is not limited to those and a configuration may be employed in which an observer such as a disturbance observer is used.

REFERENCE NUMERALS

1: stepping motor, 2: micro-step driving control apparatus, 3: driver, 4: control circuit, 5: command value generator, 6: current detector, 7: estimation calculator, 8: motor rotational angle estimator, 9: detent torque estimator, 10: compensation signal generator, 11: phase difference estimator, 12: low-speed motor rotational angle estimator, 13: high-speed motor rotational angle estimator, 14: addition unit, 15: low-speed estimated rotational angle amplifier, 16: high-speed estimated rotational angle amplifier, 17: adder, 18: storage medium, 19: first switch, 20: second switch, 100: first step, 101: second step, 102: third step, and 103: forth step.

The invention claimed is:

1. A micro-step driving control apparatus for a stepping motor comprising:
   a driver for driving the stepping motor;
   a control circuit for supplying a micro-step driving signal to the driver;
   a command value generator for supplying a command value to the control circuit;
   a current detector for detecting actual current passing through the stepping motor;
   a phase difference estimator for calculating, based on the command value and detected current detected by the current detector, an estimated phase difference between the command value and the detected current;
   a low-speed motor rotational angle estimator for calculating, based on the detected current and the micro-step driving signal, an estimated motor rotational angle ($\theta_{MEL}$) when the stepping motor rotates at a low speed at which predetermined accuracy cannot be ensured for the estimated phase difference;
   a high-speed motor rotational angle estimator for calculating, based on the estimated phase difference and the command value, an estimated motor rotational angle ($\theta_{MEH}$) when the stepping motor rotates at a high speed at which predetermined accuracy can be ensured for the estimated phase difference;
   an addition unit for calculating, based on a low-speed estimated angle gain and a high-speed estimated angle gain each of whose amplifying value varies according to the command value, an estimated motor rotational angle ($\theta_{ME}$) by mixing the estimated motor rotational angle ($\theta_{MEL}$) and the estimated motor rotational angle ($\theta_{MEH}$) at a predetermined rate;

a detent torque estimator for calculating, based on the estimated motor rotational angle ($\theta_{ME}$), estimated detent torque; and a compensation signal generator for generating a compensation signal based on the estimated detent torque and the estimated motor rotational angle ($\theta_{ME}$).

2. The micro-step driving control apparatus for the stepping motor in claim 1, wherein the low-speed motor rotational angle estimator calculates, based on the detected current and the micro-step driving signal, an estimated motor rotational angle ($\theta_{MEL}$) using a basic voltage equation and a velocity induced voltage equation.

3. The micro-step driving control apparatus for the stepping motor in claim 1, wherein the high-speed motor rotational angle estimator calculates, based on the command value and the estimated phase difference, an estimated motor rotational angle ($\theta_{MEH}$) using a relationship of a deviation between a current phase difference and a motor rotational angle.

4. The micro-step driving control apparatus for the stepping motor in claim 1, wherein the detent torque estimator calculates, based on an estimated motor rotational angle ($\theta_{ME}$), estimated detent torque using an estimation formula having up to n-th order components of detent torque.

5. The micro-step driving control apparatus for the stepping motor in claim 1, wherein the compensation signal generator generates, from an estimated motor rotational angle ($\theta_{ME}$) and estimated detent torque, a compensation signal for outputting compensation torque having the same amplitude and phase with the estimated detent torque.

6. The micro-step driving control apparatus for the stepping motor in claim 1, wherein a compensation signal inputted to the control circuit can be selected from either one of a compensation signal outputted from the compensation signal generator or a compensation signal stored beforehand in a storage medium.

7. A micro-step driving control apparatus for a stepping motor comprising:

a driver for driving the stepping motor;

a control circuit for supplying a micro-step driving signal to the driver;

a command value generator for supplying a command value to the control circuit;

a current detector for detecting actual current passing through the stepping motor;

a low-speed motor rotational angle estimator for calculating, based on the detected current and the micro-step driving signal, an estimated motor rotational angle ($\theta_{MEL}$) when the stepping motor rotates at a low speed at which predetermined accuracy cannot be ensured for the estimated phase difference;

a detent torque estimator for calculating, based on the estimated motor rotational angle ($\theta_{MEL}$), estimated detent torque; and a compensation signal generator for generating a compensation signal based on the estimated detent torque and the estimated motor rotational angle ($\theta_{MEL}$).

8. The micro-step driving control apparatus for the stepping motor in claim 7, wherein the low-speed motor rotational angle estimator calculates, based on the detected current and the micro-step driving signal, an estimated motor rotational angle ($\theta_{MEL}$) using a basic voltage equation and a velocity induced voltage equation.

9. The micro-step driving control apparatus for the stepping motor in claim 7, wherein the detent torque estimator calculates, based on an estimated motor rotational angle ($\theta_{ME}$), estimated detent torque using an estimation formula having up to n-th order components of detent torque.

10. The micro-step driving control apparatus for the stepping motor in claim 7, wherein the compensation signal generator generates, from an estimated motor rotational angle ($\theta_{ME}$) and estimated detent torque, a compensation signal for outputting compensation torque having the same amplitude and phase with the estimated detent torque.

11. The micro-step driving control apparatus for the stepping motor in claim 7, wherein a compensation signal inputted to the control circuit can be selected from either one of a compensation signal outputted from the compensation signal generator or a compensation signal stored beforehand in a storage medium.

12. A micro-step driving control apparatus for a stepping motor comprising:

a driver for driving the stepping motor;

a control circuit for supplying a micro-step driving signal to the driver;

a command value generator for supplying a command value to the control circuit;

a current detector for detecting actual current passing through the stepping motor;

a phase difference estimator for calculating, based on the command value and detected current detected by the current detector, an estimated phase difference between the command value and the detected current;

a high-speed motor rotational angle estimator for calculating, based on the estimated phase difference and the command value, an estimated motor rotational angle ($\theta_{MEN}$) when the stepping motor rotates at a high speed at which predetermined accuracy can be ensured for the estimated phase difference;

a detent torque estimator for calculating, based on the estimated motor rotational angle ($\theta_{MEH}$), estimated detent torque; and a compensation signal generator for generating a compensation signal based on the estimated detent torque and the estimated motor rotational angle ($\theta_{MEH}$).

13. The micro-step driving control apparatus for the stepping motor in claim 12, wherein the high-speed motor rotational angle estimator calculates, based on the command value and the estimated phase difference, an estimated motor rotational angle ($\theta_{MEH}$) using a relationship of a deviation between a current phase difference and a motor rotational angle.

14. The micro-step driving control apparatus for the stepping motor in claim 12, wherein the detent torque estimator calculates, based on an estimated motor rotational angle ($\theta_{ME}$), estimated detent torque using an estimation formula having up to n-th order components of detent torque.

15. The micro-step driving control apparatus for the stepping motor in claim 12, wherein the compensation signal generator generates, from an estimated motor rotational angle ($\theta_{ME}$) and estimated detent torque, a compensation signal for outputting compensation torque having the same amplitude and phase with the estimated detent torque.

16. The micro-step driving control apparatus for the stepping motor in claim 12, wherein a compensation signal inputted to the control circuit can be selected from either one of a compensation signal outputted from the compensation signal generator or a compensation signal stored beforehand in a storage medium.

* * * * *